United States Patent [19]

Bredow et al.

[11] 4,437,224

[45] Mar. 20, 1984

[54] TOOL CHANGER FOR A REVOLVING CUTTING PRESS

[75] Inventors: Walter Bredow; Gerhard Otto, both of Alfeld, Fed. Rep. of Germany

[73] Assignee: C. Behrens AG, Alfeld, Fed. Rep. of Germany

[21] Appl. No.: 226,151

[22] Filed: Jan. 19, 1981

[30] Foreign Application Priority Data

Feb. 15, 1980 [DE] Fed. Rep. of Germany ....... 3005667

[51] Int. Cl.³ ............................................. B23Q 3/155

[52] U.S. Cl. ...................................... 29/568; 29/26 A; 72/446; 83/563; 414/618

[58] Field of Search ................. 29/568, 26 A; 83/563; 100/918; 279/1 TS; 294/90, 91, 104; 409/233; 414/618, 626; 211/60 T, 1.5; 72/481, 446, 448

[56] References Cited

U.S. PATENT DOCUMENTS

| | | | |
|---|---|---|---|
| 3,160,046 | 12/1964 | Bredow | 83/552 |
| 3,191,260 | 6/1965 | Jorgensen | 29/568 |
| 3,288,032 | 11/1966 | Pankonin | 29/568 |
| 3,548,480 | 12/1970 | Daniels | 83/563 |
| 3,628,231 | 12/1971 | Pancook | 29/568 |
| 3,662,442 | 5/1972 | Noa | 29/568 |
| 3,788,760 | 1/1974 | Daniels | 408/3 |
| 3,844,028 | 10/1974 | Hague | 29/568 |
| 3,953,039 | 4/1976 | Hague | 279/1 TS |
| 4,041,817 | 8/1977 | Nelson | 83/552 |
| 4,053,968 | 10/1977 | Johnson | 279/1 TS |
| 4,182,022 | 1/1980 | Kristiansson | 29/568 |
| 4,205,427 | 6/1980 | Koch et al. | 29/568 |

*Primary Examiner*—William R. Briggs
*Assistant Examiner*—Daniel W. Howell
*Attorney, Agent, or Firm*—Michael J. Striker

[57] ABSTRACT

An arrangement in a revolving press for withdrawing or inserting a tool holder carrying a punch from and into an opening in a turntable of the press when the tool holder turns with the turntable to an exchange position. The tool holder is in the exchange position temporarily held by a slide engaging a tool holder head projecting upwardly from the tool holder. A guide member substantially aligned with the axis of the tool holder in the exchange position carries at its lower end a gripping claw in such a manner that when the guide member is lowered while the slide is withdrawn, the claw will engage the tool holder head. Thereafter the guide member is raised, moving the tool holder out of the opening in the turntable and finally the tool holder is manually removed from the guide member so that a new punch can be mounted thereon, whereafter the tool holder is moved in reverse direction back into the opening of the turntable.

13 Claims, 7 Drawing Figures

A 9a
9
29
27
14
27a
15
4
6
5
A
2
1
3

9a
9
29
4
27
14
15
6
5
2
3
8
26
1

TOOL CHANGER FOR A REVOLVING CUTTING PRESS

BACKGROUND OF THE INVENTION

The present invention relates to an arrangement for exchange of an upper tool, especially a punch, carried by a tool holder on a turntable of a revolving cutting press, in which the tool holder provided with a tool holder head is axially upwardly withdrawably mounted in an opening of the turntable while being prevented from turning about its axis.

In known revolving cutting presses it has hitherto been common practice to exchange the tools manually and also the upper tools, especially punches, which are carried by a tool holder. The exchange of such punches has up to now usually been carried out in the following manner:

The tool holder with the punch mounted thereon is manually removed from the upper turntable. Only at heavy presses in which the tool holder is rather heavy, simple lifting tools have occasionally been used to lift the tool holder from the turntable, that is also in this case separate devices independent from the press have been used. After exchange of the punch in the tool holder, the latter has been pushed back into the bore of the upper turntable. Since the tool holder is guided with very small clearance in the opening of the turntable, considerable difficulties have often been encountered which lead also to damage of the bore in the upper turntable. In addition, the manual exchange of the tool holder in the aforementioned manner was not only difficult but also very time-consuming.

SUMMARY OF THE INVENTION

It is an object of the present invention to mechanize and to simplify and therewith to expedite the exchange of an upper tool, especially a punch carried by a tool holder, by providing means mounted on the press, in order to avoid the above-mentioned difficulties and the danger of damaging either the tool holder or the bore in the turntable in which the tool holder is lodged.

With these and other objects in view, which will become apparent as the description proceeds, there is provided an exchange device above the upper turntable in an exchange position of the latter, in which the device is aligned with and movable substantially coaxially or with parallel axis in the direction of the longitudinal axis of the holder and including a guide member prevented from turning about its axis arranged on the frame of the press in which the guide member is provided at its lower end facing a tool holder head projecting upwardly from the tool holder with a gripping element connectable with the tool holder head and in which the tool holder head in the exchange position is supportable by a supporting member movably mounted on the press frame between a supporting and a releasing position. This will assure that the tool holder can, in exact alignment with the opening in the turntable, be withdrawn therefrom or placed into the opening. The turntable is turned in a manner known per se, and not forming part of the present invention, by a device on the press frame into an exchange position in which the guide member and the tool holder are aligned with each other. Subsequently thereto, the guide member is lowered and the tool holder head is engaged by the gripping element. The tool holder head is in this exchange position positively held by the support member. After the gripping element has engaged the tool holder head, the support member is moved out of its supporting position to release the tool holder. Subsequently thereto, the tool holder is moved out of the turntable by upwardly moving the guide member by a drive mounted on the press. Thereafter, the tool, especially a punch, can be removed from the tool holder and exchanged for a new one. The guide member is then exactly aligned lowered and the tool holder is moved again in the corresponding bore of the turntable. Since during the respective movement of the guide member the tool holder and the guide member can be considered as a unit, it is possible to assure exact movement of the holder relative to the bore in the turntable so that the above-mentioned difficulties, and especially damage of the tool holder or the bore in the turntable, are completely avoided. The movement of the mentioned parts is carried out by suitable drive means, especially with pneumatically or hydraulically operated drive units. The exchange procedure is thus practically completely mechanized and therewith simplified and accelerated.

The gripping element is, in accordance with an especially advantageous construction of the present invention, constructed as a gripping claw movable under the action of a spring toward the tool holder head to engage the latter at a bottom face thereof. Such a gripping claw can be easily controlled to engage by gripping movement a bottom face of the tool holder head or release the latter and is therefore especially suitable for a simple mounting on the guide member. Preferably, the gripping claw is mounted on the guide member pivotable about a tilting axis transverse to the axis of the latter and having a cam face to engage the tool holder head to tilt the gripping claw about its tilting axis against the action of a spring and following the cam face a holding face adapted to engage the bottom face of the tool holder head. During the downward movement of the guide member, the gripping claw will by means of the cam face be deflected and can when the guide member reaches its lowermost position engage under the action of the spring the bottom face of the tool holder head. A release of the tool holder head after renewed mounting of the tool holder in the bore of the turntable can be accomplished in an easy manner by tilting the gripping claw against the action of the spring.

Thereby it is especially advantageous, if in accordance with a further feature of the present invention, the gripping claw is provided with a pair of laterally displaced legs extending to opposite sides of the tool holder head, in which the free ends thereof abut against the support member in the supporting position of the latter to move thereby the gripping claw to the releasing position. This will assure that during the movement of the support member to its supporting position, the gripping claw will automatically be tilted to its releasing position, whereafter the guide member, without the tool holder, can be moved into its upper starting position.

For an exact guiding of the guide member and its drive, it is advantageous, if in accordance with a further feature of the present invention, the guide member is slidably guided for reciprocation in axial direction in a housing mounted on the press frame and in which the double-acting drive, likewise mounted on the press frame, is connected to the upper end of the guide member. The housing preferably encompasses an essential portion of the guide member, whereby at the same time, especially by means of a key, turning of the guide member relative to the housing is prevented. This arrangement of the drive leads to a simple construction and to a trouble-free movement of the guide member.

According to a further feature of the present invention, the support member is constructed as a slide guided on the press frame for movement in a direction normal to the longitudinal axis of the tool holder and having an end facing the latter so as to engage in the supporting position a bottom face of the tool holder head and to move at the same time the gripping element, respectively the gripping claw, to its releasing position. Such a slide can be guided in a simple manner and may be reciprocated with simple means. The means for reciprocating the slide comprise, according to a further feature of the present invention, double-acting drive means having opposite ends and a crank lever pivotally connected to the press frame, in which one of the ends of the double-acting drive means is pivotally connected to the housing and the other end being pivotally connected to one arm of the crank lever, whereas the other arm of the latter engages the slide for moving the same between the positions thereof.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRRED EMBODIMENT

Figure 1:
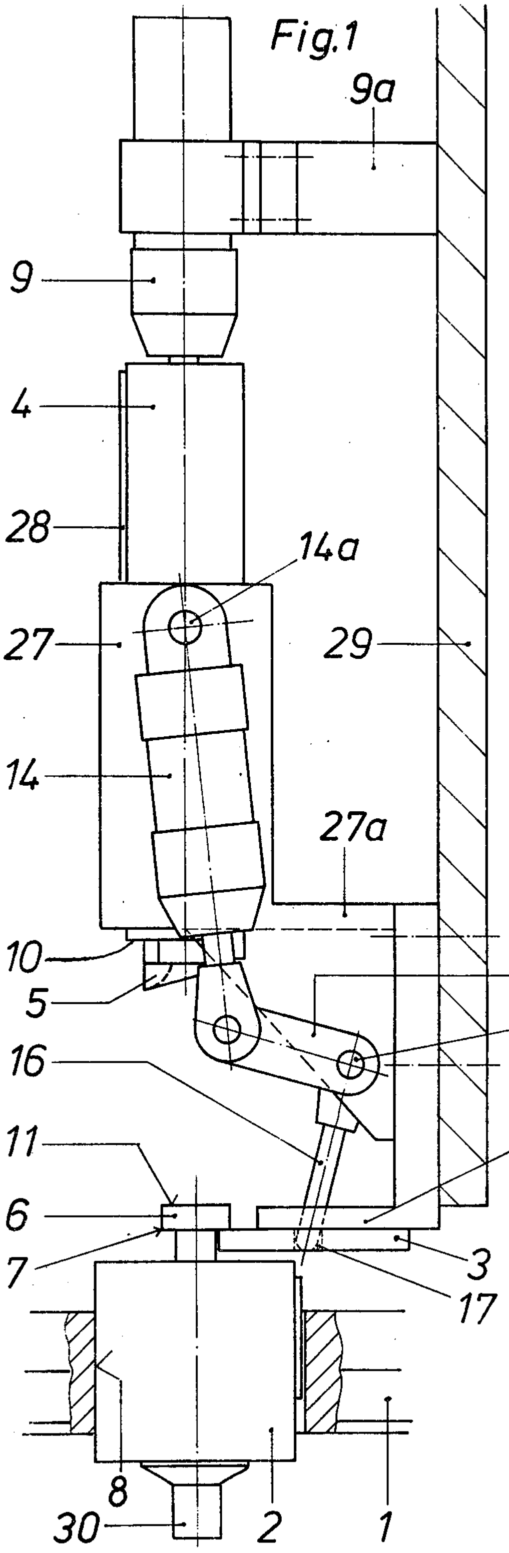
FIG. 1 is a partly sectioned side view of the arrangement according to the present invention and showing a tool holder in the upper turntable of a press in the exchange position but in a rest position of the device for moving the tool holder out of the opening of the turntable.

FIGS. 1–5 illustrate, in a revolving cutting press of known construction, a device for exchanging a punch carried by a holder. As shown in these Figures, an upper turntable 1 of known construction, not forming part of the present invention, is provided with a bore 8 in which a tool holder 2 with a punch 30 is inserted and secured against rotation about its axis, for instance by a key 24. The tool holder 2 is provided at its upper surface with a tool holder head 6 of T-shaped cross-section and forming a lower annular face 7. The turntable 1 transfers the tool holder 2 with the punch 30 from the illustrated tool exchange position to a non-illustrated punching or working position of the press.

A guide member 4 aligned with the longitudinal axis of the tool holder 2 in the illustrated exchange position is reciprocable along its axis in a housing 27 and prevented from rotation about its axis by a key 28. The housing 27 is mounted by a bracket 27*a* on the outer surface of a C-shaped press frame 29 of the revolving cutting press, only partially shown in the drawing. The guide member 4 carries at its lower end, facing the tool holder head 6, a gripping element in form of a gripping claw 5, the construction and arrangement of which will be further described in connection with FIGS. 6 and 7. The gripping claw 5 will engage in the lowermost position of the guide member 4 the annular face 7 of the tool holder head 6. A pneumatically or hydraulically operated cylinder and piston unit 9 connected by a bracket 9*a* to the press frame 29 is coaxially connected in any convenient manner to the upper end of the guide member to reciprocate the latter along its axis.

A projecting lower arm 27*b* of the bracket 27*a* carries at the bottom face thereof a supporting member for the tool holder 2 constructed as a slide 3 movable in a direction normal to the longitudinal axis of the tool holder. The end portion of the slide 3 facing the tool holder engages in the supporting position of the slide illustrated in FIGS. 1 and 2 the annular bottom face 7 of the tool holder head 6 to thereby support the tool holder 2 in the bore 8 of the turntable 1. The slide 3 is guided for reciprocation in the aforementioned direction in the lower arm 27*b* of the bracket 27*a* in any convenient well known manner not illustrated in the drawing. A fluid operated cylinder and piston unit 14 tiltably mounted at its upper end at 14*a* on the housing 27 is provided for reciprocating the slide 3. The drive means of the slide 3 includes further a crank lever 15 tiltably mounted at 18 on the bracket 27*a* and having an upper arm tiltably connected to the piston rod of the cylinder and piston unit 14, whereas the lower arm 16 of the crank lever 15 projects into a bore 17 in the slide which can thus be reciprocated during the tilting movement of the crank lever 15.

Figure 2:
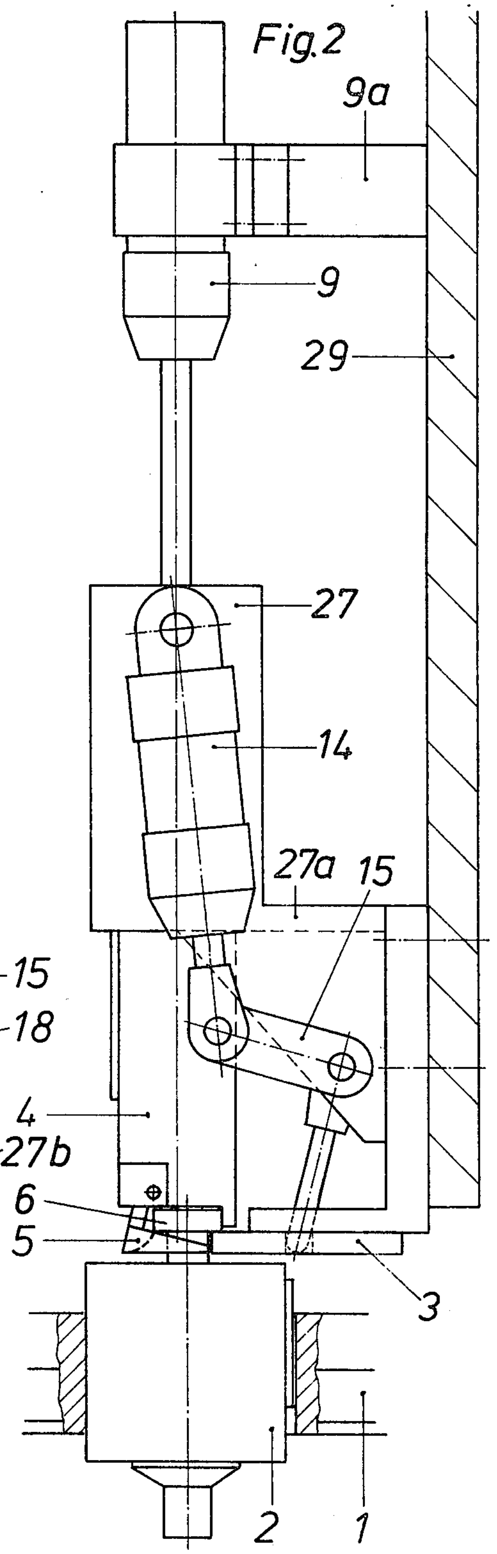
FIG. 2 is a side view similar to FIG. 1 after lowering of the guide member onto the tool holder before the tool holder head is engaged by the gripping claw while the tool holder is supported by the support member.
Figure 3:
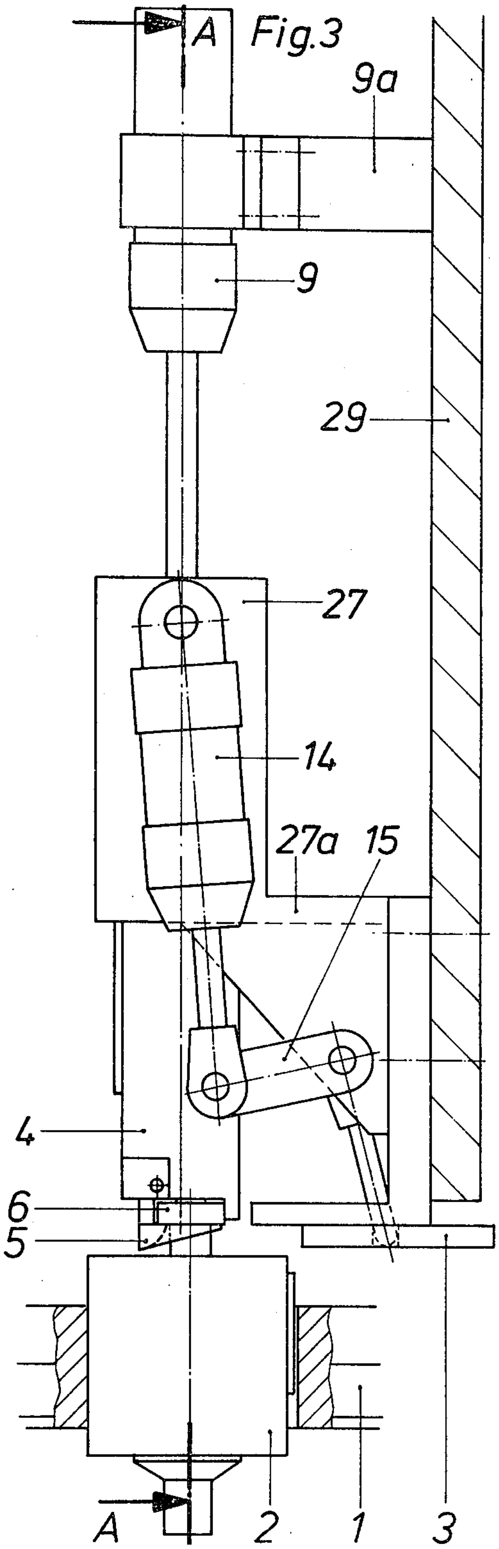
FIG. 3 is a side view similar to FIG. 1 in which the support member is withdrawn while the gripping claw engages the tool holder head.
Figure 4:
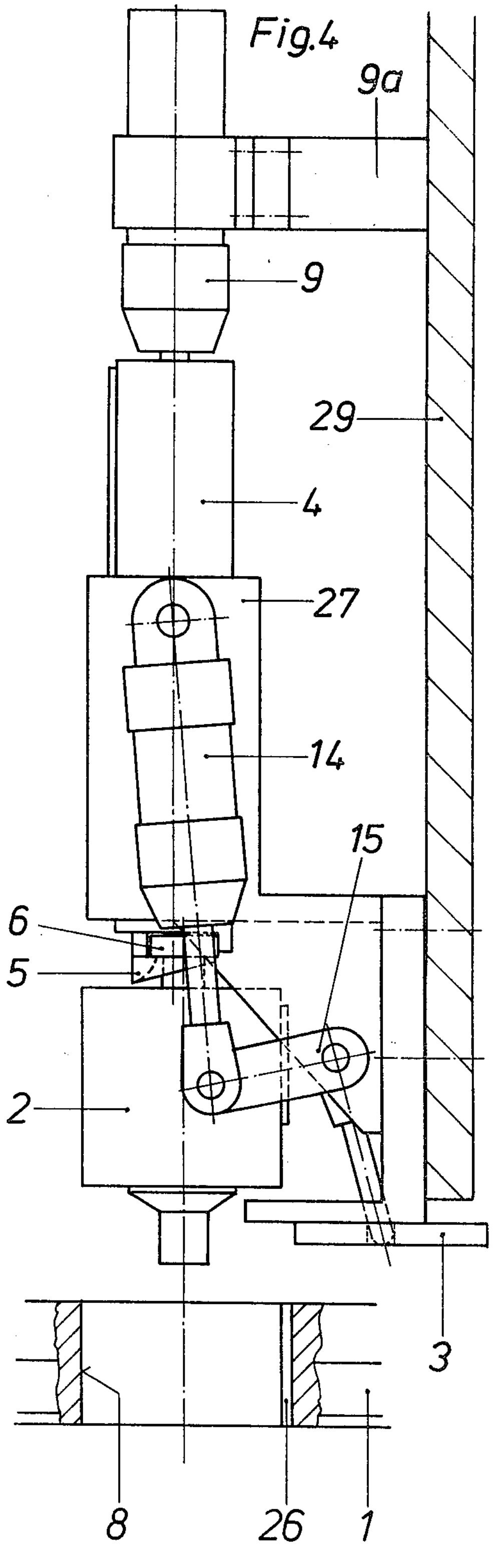
FIG. 4 is a side view corresponding to FIG. 1 in which the guide member is upwardly moved to thereby pull the tool holder out of the opening in the turntable.
Figure 5:
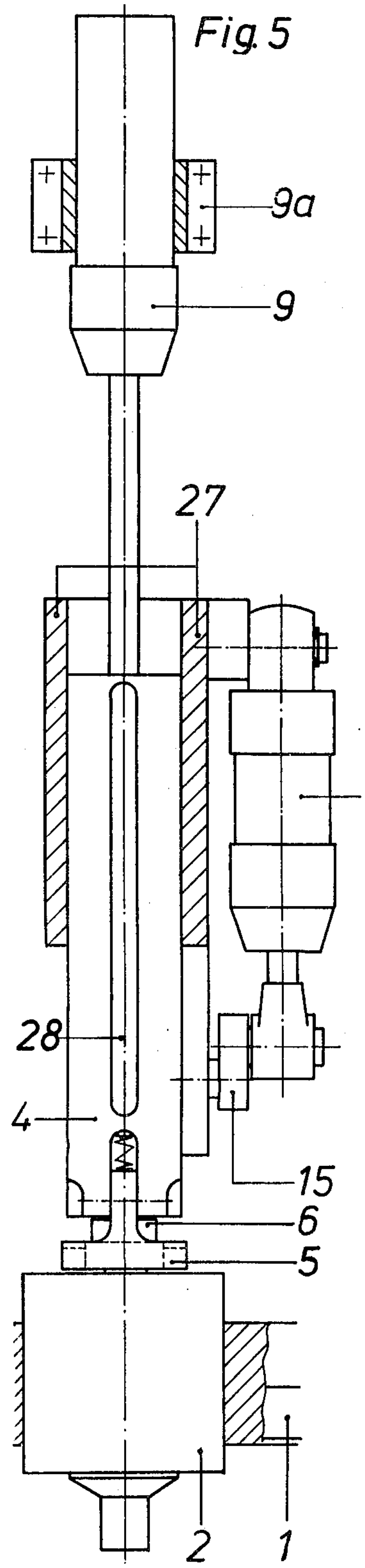
FIG. 5 is a section taken along the line A—A of FIG. 3.
Figure 6:
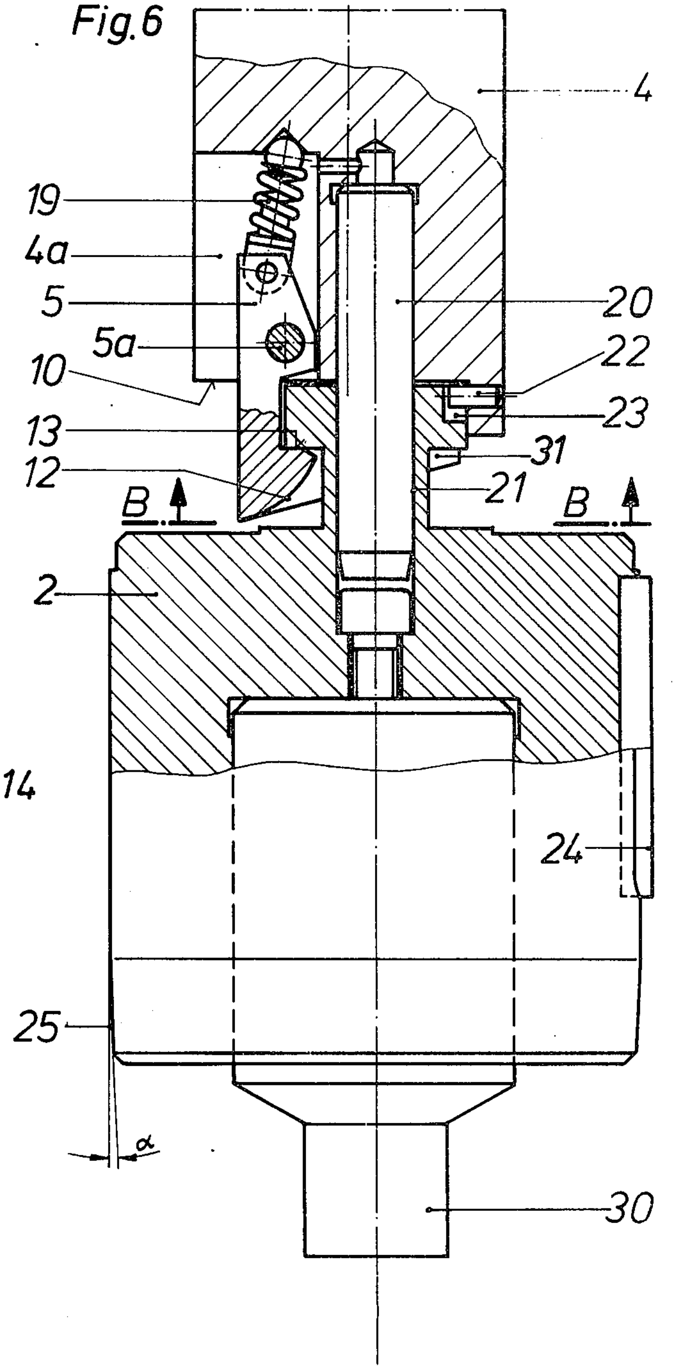
FIG. 6 is an enlarged partly sectioned side view showing the connection between the lower end of the guide member and the tool holder.
Figure 7:
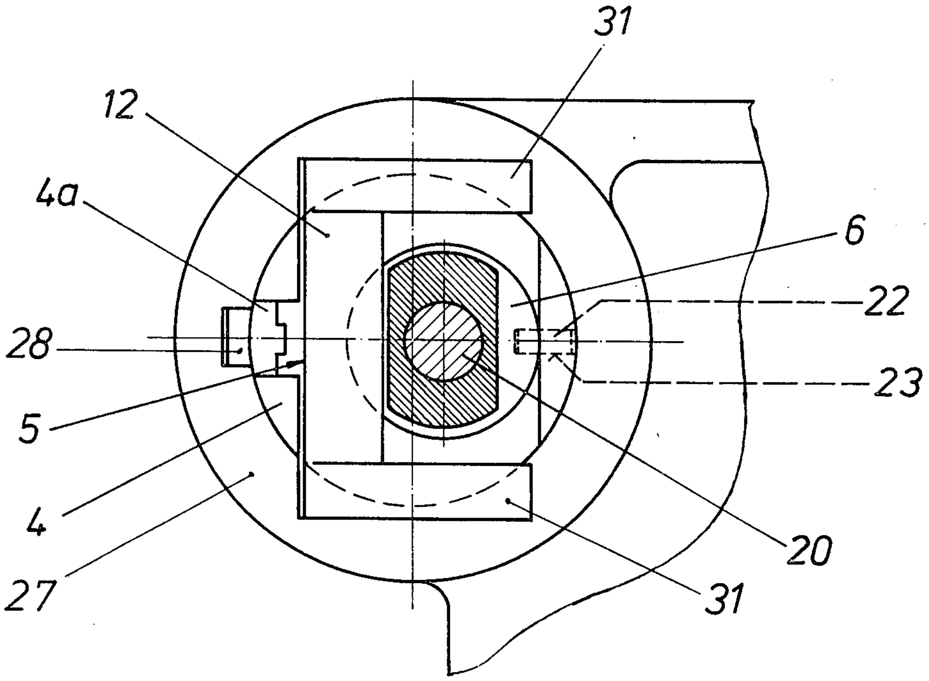
FIG. 7 is a section taken along the line B—B of FIG. 6.

Further details of the connection between the guide member 4 and the tool holder 2 are illustrated in FIGS. 6 and 7. As best shown in FIG. 6, the gripping claw 5 comprises a tilting lever arranged in a cut-out 4*a* provided at the lower end of the guide member 4, tiltable about a pivot pin 5*a* and having an upper end engaged by coil compression spring 19 likewise arranged in the cut-out 4*a*. The gripping claw 5 is provided at the side thereof facing the tool holder head 6 with a cam face 12 slidable against the action of the spring 19 on the tool holder head 6 and following the cam face with a holding face 13 engaging the annular bottom face 7 in the position of the gripping claw 5 illustrated in FIG. 6. The gripping claw 5 includes further, as shown in FIGS. 6 and 7, two transversely spaced legs 31 adapted to extend past opposite sides of the tool holder head beneath the bottom face 7 thereof, and the free ends of the legs 31 are engaged by the slide 3 in the supporting position of the latter to thereby move the gripping claw 5 to its releasing position as shown in FIG. 2 and as will be described in further detail below. The guide member 4 carries further at its lower end a catch pin 20 projecting therefrom which during downward movement of the guide member 4 enters into a coaxial bore 21 passing through the tool holder head 6 and partly also through the tool holder 2. The guide member 4 carries also at its lower end a radially extending pin 22 which during downward movement of the guide member 4 enters into a complementary recess 23 provided on the tool holder head 6. As further seen in FIG. 6, the cylindrical tool holder 2 has a lower, slightly conical end portion 25. FIG. 6 illustrates also the punch carried by the tool holder 2.

The above-described arrangement will be operated as follows:

The tool holder 2 which is to be removed from the upper turntable 1 for exchange of the punch 30 carried thereby is brought by turning of the turntable 1 into an exchange position in which it is arranged aligned with the guide member 4 and then fixed in this position. The means for turning the table 1 and for arresting the same in the aforementioned position are well known in the art and are therefore, for the sake of simplicity, not illustrated in the drawing. In this position, in which the guide member 4 and the tool holder 2 are substantially aligned, the pressure side of the double-acting cylinder and piston unit 9 is impinged by a pressure fluid so that the guide member 4 moves from the position shown in FIG. 1 to the position shown in FIG. 2 until the bottom face 10 of the guide member engages the top face 11 of the tool holder head 6. During the last part of the downward movement of the guide member 4, the cam face 12 of the gripping claw 5 will slide on a side face of the tool holder head 6, while in the lowermost position of the guide member 4 the gripping claw 5 will tilt about the pivot pin 5*a* under the action of the compression spring 19 so that the holding face 13 of the claw 5 will engage the annular bottom face 7 of the tool holder head 6. The gripping claw can, however, move to this position illustrated in FIG. 6 only after the pressure side of the fluid-operated cylinder and piston unit 14 is impinged with pressure fluid so that the crank lever 15 is tilted in such a manner that its arm 16 engaged in the bore 17 will withdraw the slide 3 from engagement with the tool holder head 6 so that the gripping claw 5 may move, under the action of the spring 19, to the position shown in FIGS. 3 and 6. Subsequently thereto, the pulling side of the cylinder and piston unit 9 is impinged with pressure fluid, so that the guide member 4 will move in upward direction and the tool holder 2 connected thereto will be drawn out of the bore 8 in the turntable 1 and be brought to the position illustrated in FIG. 4. The tool holder 2 may then be removed from the guide member 4 by manually disengaging the gripping claw 5 from the tool holder head 6, whereafter the tool holder 2 may be withdrawn in downward direction from the catching pin 20.

After exchange of the punch 30 for another one, the tool holder 2 will be again moved in reverse sequence into the opening 8 of the turntable 1. Thereby the catch pin 20 is first inserted into the bore 21 in the tool holder 2. Care has to be taken thereby that the radial pin 22 on the guide member 4 will enter into the recess 23 in the tool holder head 6 to properly orient the tool holder so that the key 24 thereof will, during lowering of the guide member 4, properly enter into the groove 26 provided in the opening 8 in the turntable. In this position, the tool holder 2 is connected with the guide member 4 by the gripping claw 5. Since the pin 20 engages into the bore 21 of the tool holder 2 with an extremely small clearance, the tool holder 2 and the guide member 4 will form a unit so that it is possible, by impinging the pressure side of the cylinder and piston unit 9 with pressure fluid, to move the tool holder 2 exactly into the bore 8 of the upper turntable 1, whereby the slight cone 25 at the lower end of the tool holder 2 will facilitate such movement. The angle alpha shown in FIG. 6 should thereby be held as small as possible. In order to release the connection between the tool holder 2 and the guide member 4, the slide 3 is moved by impinging the cylinder and piston unit 14 with pressure fluid into the position shown in FIGS. 1 and 3. In this position the slide 3 abuts with its front edge against the free ends of the legs 31 of the gripping claw 5 to move the latter against the action of the compression spring 19 to a position in which the holding face 13 of the claw 5 is disengaged from the tool holder head 6, whereafter by impinging the pulling side of the cylinder and piston unit 9 with pressure fluid the guide member can be moved into its upper position as shown in FIG. 1. By thereafter turning the turntable 1, the tool holder with the new tool inserted therein can be brought into working position.

It will be understood that each of the elements described above, or two or more together, may also find a useful application in other types of arrangements for exchange of an upper tool of a revolving press carried by the tool holder on a turntable of the press, differing from the types described above.

While the invention has been illustrated and described as embodied in an arrangement for exchange of an upper tool of a revolving press carried by a tool holder on a turntable of the press in which the elements for moving the tool holder into and out of a bore in the turntable are carried by the press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a revolving press, a combination comprising a press frame; a turntable turnably mounted on said press frame; tool holder means adapted to carry a punch, said tool holder means having an axis and being mounted in an opening of the turntable for reciprocation along said axis while being prevented from turning about said axis and movable with the turntable between a working and an exchange position; means connected to said press frame above said turntable for releasably engaging said tool holder means and means for moving the latter, when in said exchange position, in direction of said axis into or out of said opening; said tool holder means including at an upper end thereof a tool holder head, said moving means comprising a guide member operatively connected to said press frame and having an axis parallel with said axis of the tool holder means in the exchange position of the latter, said guide member being movable along its axis while being prevented from turning about the same and carrying at an end thereof facing said tool holder head gripping means movable between a position engaging said tool holder head and a releasing position; and support means mounted on said press frame and movable in a direction transverse to said axis of said tool holder means for supporting the latter when said gripping means is in said releasing position.

2. A combination as defined in claim 1, wherein said tool holder head projects upwardly from an upper end of said tool holder and has a bottom face spaced from and directed towards said upper end of said tool holder, and wherein said grippiing means comprise a gripping claw and spring means biasing the latter into engagement with said bottom face of said tool holder head.

3. A combination as defined in claim 2, wherein said gripping claw is mounted on said guide member pivotable about a tilting axis transverse to the axis of the latter and having a cam face adapted to engage said tool holder head to tilt said gripping claw about its tilting axis against the action of said spring means and following said cam face a holding face adapted to engage said bottom face of said tool holder head.

4. A combination as defined in claim 3, wherein said gripping claw further includes two transversely spaced legs adapted to straddle a portion of said tool holder head beneath the bottom face of the latter, said legs having free ends adapted to be engaged by said support means during movement of the latter towards said axis of said tool holder means to thereby move said gripping claw out of engagement with said bottom face of the tool holder head.

5. A combination as defined in claim 4, wherein said support means comprises a slide mounted on said press frame movable in a direction normal to the axis of said tool holder means, means connected to the slide for moving the latter between a supporting position engaging said bottom face of said tool holder head while simultaneously moving said gripping means to said releasing position, and a position out of engagement with said bottom face.

6. A combination as defined in claim 5, and including a housing fixed to said press frame for guiding said guide member, and wherein said moving means for said slide comprises second double-acting drive means having opposite ends and a crank lever pivotally connected to said press frame, one of said ends of said further drive means being pivotally connected to said housing and the other end being pivotally connected to one arm of said crank lever, the other arm of the latter engaging said slide for moving the same between said positions thereof.

7. A combination as defined in claim 2, wherein said guide member is provided at a portion thereof facing said tool holder means with a cut-out, wherein said gripping claw is in the form of a lever tiltably mounted intermediate its ends in said cut-out, said spring means biasing said gripping claw into engagement with said bottom face comprising a compression spring connected at opposite ends respectively to the upper end of said lever and to said guide member.

8. In a revolving press, a combination comprising a press frame; a turntable turnably mounted on said press frame; tool holder means adapted to carry a punch, said tool holder means having an axis and being mounted in an opening of the turntable for reciprocation along said axis and movable with the turntable between a working position and an exchange position, said tool holder means having at an upper end thereof a tool holder head; means connected to said press frame above said turntable for releasably engaging said tool holder means when the latter is in said exchange position; and means for moving said tool holder means in direction of said axis into or out of said opening, said moving means having a guide member operatively connected to said press frame and having an axis parallel with said axis of the tool holder means in the exchange position of the latter, said guide member being movable along its axis while being prevented from turning about the same and carrying at an end thereof facing said tool holder head gripping means movable between a position engaging said tool holder head and a releasing position.

9. A combination as defined in claim 8, including a housing mounted on said press frame and having an axis coaxial with that of the guide member, said guide member being slidably guided in said housing, said moving means comprising first double-acting drive means mounted on said press frame and having a lower end connected to said guide member for reciprocating the same along its axis.

10. A combination as defined in claim 9, and including a catch pin projecting from the lower end of said guide member facing said tool holder means coaxial with the latter, and wherein said tool holder means is formed with a coaxial guide bore into which said catch pin engages during movement of said guide member towards said tool holder means.

11. A combination as defined in claim 9, and including a projection laterally displaced from the axis of said guide member arranged in the region of the latter facing said tool holder means, and wherein said tool holder head is provided with a recess arranged for receiving said projection during movement of said guide member towards said tool holder means.

12. A combination as defined in claim 8, wherein said tool holder means has a lower slightly conical end portion.

13. A combination as defined in claim 8, further comprising means for preventing said tool holder means from rotation about said axis.

* * * * *